(12) United States Patent
Hornqvist et al.

(10) Patent No.: US 8,857,779 B2
(45) Date of Patent: Oct. 14, 2014

(54) HOLDER FOR A HOLOGRAPHIC GRATING

(75) Inventors: Mikael Hornqvist, Uppsala (SE); Patrik Akerstrom, Uppsala (SE); Stig Tormod, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 307 days.

(21) Appl. No.: 13/262,251

(22) PCT Filed: Mar. 29, 2010

(86) PCT No.: PCT/SE2010/050342
§ 371 (c)(1),
(2), (4) Date: Sep. 30, 2011

(87) PCT Pub. No.: WO2010/114466
PCT Pub. Date: Oct. 7, 2010

(65) Prior Publication Data
US 2012/0013963 A1    Jan. 19, 2012

(30) Foreign Application Priority Data

Mar. 30, 2009  (SE) .................................. 0900417

(51) Int. Cl.
| | |
|---|---|
| *F16M 13/00* | (2006.01) |
| *G01J 3/18* | (2006.01) |
| *G02B 7/00* | (2006.01) |
| *G01J 3/02* | (2006.01) |
| *G01J 3/42* | (2006.01) |
| *G01J 3/28* | (2006.01) |

(52) U.S. Cl.
CPC ................. *G01J 3/02* (2013.01); *G01J 3/1838* (2013.01); *G02B 7/004* (2013.01); *G01J 2003/2866* (2013.01); *G01J 3/42* (2013.01); *G01J 3/0202* (2013.01)
USPC ........... 248/516; 359/15; 359/819; 248/181.1

(58) Field of Classification Search
USPC ............ 359/15, 545, 703, 819; 248/430, 481, 248/516, 181.1–181.2, 288.31
See application file for complete search history.

(56) References Cited

U.S. PATENT DOCUMENTS

| | | | | |
|---|---|---|---|---|
| 973,558 | A | * | 10/1910 | Pierce .............................. 285/64 |
| 4,496,416 | A | | 1/1985 | Machler et al. |
| 4,668,059 | A | * | 5/1987 | Ohyama ....................... 248/549 |
| 5,124,857 | A | * | 6/1992 | Pitz ................................. 359/872 |

(Continued)

FOREIGN PATENT DOCUMENTS

| | | |
|---|---|---|
| EP | 0 984 253 | 3/2000 |
| JP | 2-119633 | 9/1990 |

(Continued)

OTHER PUBLICATIONS

Notice of Preliminary Rejection Dated Feb. 25, 2014 Issued on Corresponding JP Application No. 2012-503368.

*Primary Examiner* — Jennifer L. Doak

(57) ABSTRACT

An adjustable holder (1) for a concave holographic grating (2) for enabling the correct positioning of the grating vis-à-vis a light entrance port (15) and a light exit port (20), characterized in, that it comprises a grating hinge (10) fixed to said grating, said grating hinge (10) enabling rotational adjustment of the grating position with respect to said holder (1), the center point of the rotational adjustment being located at the vertex of said grating (2).

4 Claims, 4 Drawing Sheets

(56) References Cited

U.S. PATENT DOCUMENTS

| | | | |
|---|---|---|---|
| 5,436,769 A * | 7/1995 | Gilbert et al. | 359/874 |
| 5,604,589 A | 2/1997 | Kraiczek | |
| 6,226,084 B1 | 5/2001 | Tormod | |
| 6,888,920 B2 * | 5/2005 | Blank et al. | 378/81 |
| 6,915,996 B2 * | 7/2005 | Lin | 248/288.51 |
| 7,110,194 B2 * | 9/2006 | Hubbs | 359/822 |
| 7,175,292 B2 * | 2/2007 | Flynn | 359/876 |
| 7,372,625 B2 * | 5/2008 | Jagemann | 359/368 |
| 7,495,849 B2 * | 2/2009 | Heuser et al. | 359/819 |
| 7,748,669 B2 * | 7/2010 | Lu et al. | 248/181.1 |
| 7,916,408 B2 * | 3/2011 | Blanding et al. | 359/813 |
| 8,061,920 B2 * | 11/2011 | Wimberley | 403/90 |
| 8,083,190 B1 * | 12/2011 | Ma et al. | 248/181.1 |
| 8,282,055 B2 * | 10/2012 | Burklin | 248/187.1 |
| 8,451,552 B2 * | 5/2013 | Oya | 359/823 |
| 2004/0227049 A1 * | 11/2004 | Lang et al. | 248/476 |
| 2005/0151040 A1 * | 7/2005 | Hsu | 248/214 |
| 2005/0243390 A1 * | 11/2005 | Tejnil | 359/15 |
| 2006/0082771 A1 | 4/2006 | Doerrmann et al. | |
| 2007/0177282 A1 * | 8/2007 | Makino et al. | 359/819 |
| 2009/0196597 A1 * | 8/2009 | Messinger et al. | 396/427 |
| 2010/0193649 A1 * | 8/2010 | Wiegers | 248/183.1 |
| 2011/0147548 A1 * | 6/2011 | Kang | 248/181.2 |
| 2013/0078855 A1 * | 3/2013 | Hornick et al. | 439/571 |

FOREIGN PATENT DOCUMENTS

| | | |
|---|---|---|
| JP | 06-034860 | 2/1994 |
| JP | 07-103823 | 4/1995 |
| JP | 07-199038 | 8/1995 |
| JP | 2000-167683 | 6/2000 |
| WO | WO 01/59488 | 8/2001 |

* cited by examiner

HOLDER FOR A HOLOGRAPHIC GRATING

CROSS-REFERENCE TO RELATED APPLICATIONS

This application is a filing under 35 U.S.C. §371 and claims priority to international patent application number PCT/SE2010/050342 filed Mar. 29, 2010, published on Oct. 7, 2010 as WO 2010/114466, which claims priority to application number 0900417-7 filed in Sweden on Mar. 30, 2009.

TECHNICAL FIELD

The present invention pertains to the field of holders for holographic gratings. More specifically it pertains to the field of adjustable holders for concave holographic gratings for use e.g. in optical units where monochromatic light is to be generated.

BACKGROUND OF THE INVENTION

Concave holographic gratings are commonly used in tuneable monochromators for obtaining monochromatic light of one or several wave-lengths. A typical application of such a grating is the use in the optical unit of e.g. a chemical analysis instrument such as an HPLC (High Performance Liquid Chromatography) system wherein high intensity monochromatic light via an optical fiber impinges on a flow cell through which the liquid to be analyzed, usually containing a protein, is flowing. When mounting the concave holographic grating in the optical unit it is crucial that the grating is aligned in a correct position vis-à-vis an entrance port from which the light derives and an output port constituting the entrance of the optical fiber. In order to achieve a consistent output, the vertex of the grating should be held essentially at the center of revolving of the holder, i.e. to the center of the axis around which the grating is revolved with high precision when the grating is used to generate different wave-lengths. Previously this adjustment has been performed e.g. by a "tripod" arrangement with three non-orthogonal screws which implies that the adjustment is not pure vertical or pure horizontal but gives a tilt. Furthermore the adjustment implies that the position of the vertex of the concave surface of the grating may be moved away from the center of revolving of the holder. Thus there is a need for an improved holder for a concave holographic grating where the adjustment is less cumbersome.

SUMMARY OF THE INVENTION

In a first aspect it is an object of the present invention to provide for an adjustable holder for a concave holographic grating for enabling the correct positioning of the grating vis-à-vis a light entrance port and a light exit port. A holder meeting this aspect is defined in claim 1 of the appended claims.

Further scope and applicability of the present invention will become apparent from the detailed description given hereinafter. However, it should be understood that a detailed description and specific examples while indicating preferred embodiments of the invention are given by way of illustration only. There are changes and modifications within the spirit and scope of the invention which will become apparent to those skilled in the art from the detailed description below.

Specifically it should be noted that the use of the holder of the invention is illustrated for an optical unit in an HPLC system. However, it is useful in many other fields of application where there is a need for a holder for a concave holographic grating where the position of the grating could easily be adjusted with a high precision.

DETAILED DESCRIPTION OF THE INVENTION

Figure 1:
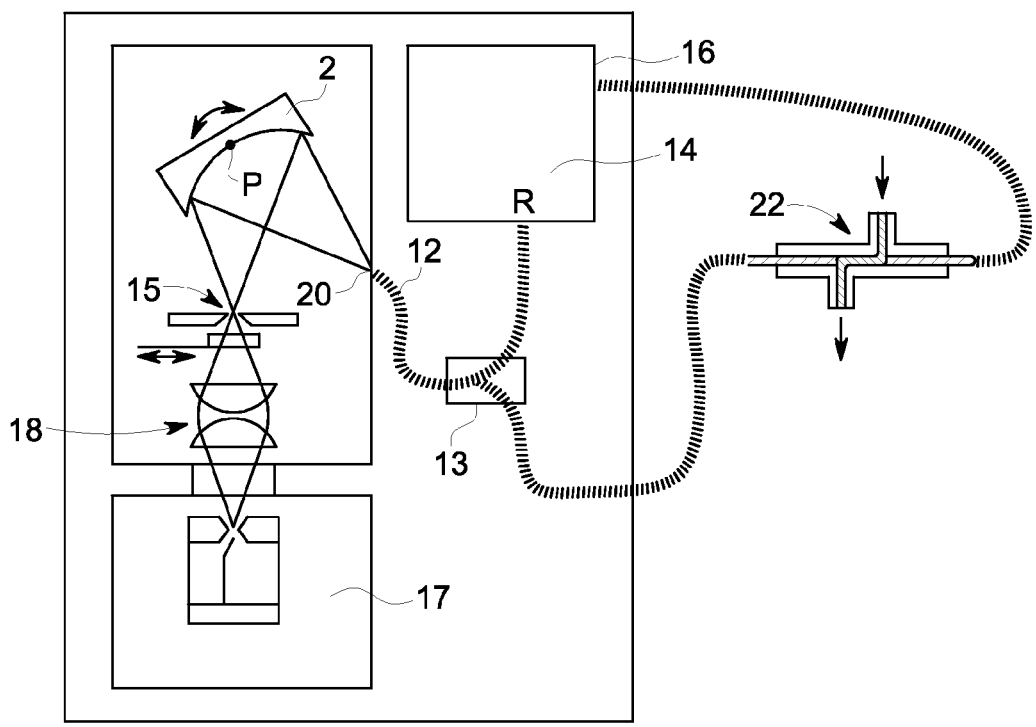
FIG. 1 is a top schematic view of an optical unit for an HPLC system.

In FIG. 1, showing a schematic view of an optical unit for an HPLC system, reference 17 denotes a flash lamp, e.g. a xenon flash lamp, the light flashes of which via a condenser and a block filter 18 and an entrance port 15 impinges on a concave holographic grating 2. The grating 2 is used for impinging monochromatic light of various wave-lengths onto an output port 20 coupled to an optical fiber 21. The grating 2 causes a diffraction of the light and thus different and desired wave-lengths of light can be directed towards the port 20 by revolving the grating around a pivot point P. In order to obtain the exact desired wave-length at the output port 20 it is important that the revolving of the grating is made with an extremely high precision. An example of how this can be achieved is described e.g. in the U.S. Pat. No. 6,226,084 and does not form part of the present invention. The monochromatic light from the output port 20 is via the optical fiber 21 directed through a flow cell 22 for the liquid to be analyzed to a sample detector 16 as well as to a reference detector 14 so as to make possible to measure the absorbance of light in the flow cell. To make the optical unit function in an optimal way it is important that the grating 2 is correctly positioned with a very high accuracy vis-a-vis the entrance slit 8 and the output port 20. Thus the vertex of the concave grating has to be located at the center of rotation.

Figure 2:
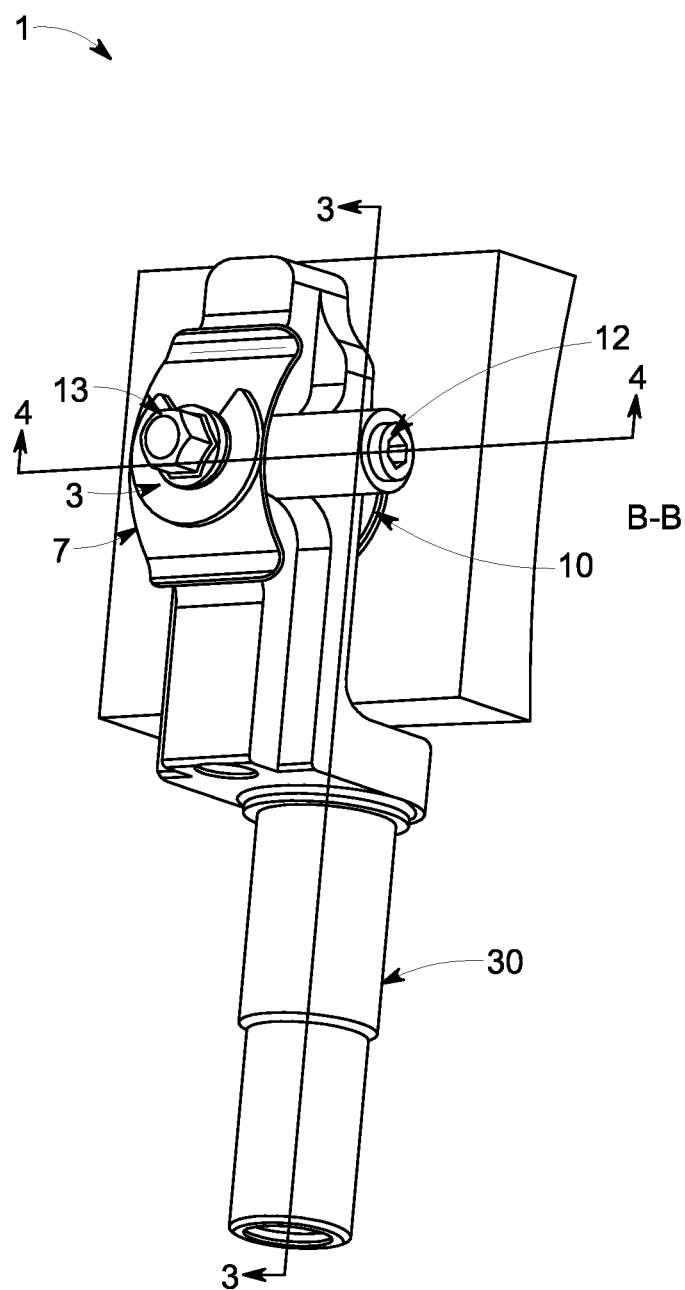
FIG. 2 is a perspective view of a holder for a concave holographic grating according to the invention.
Figure 3:
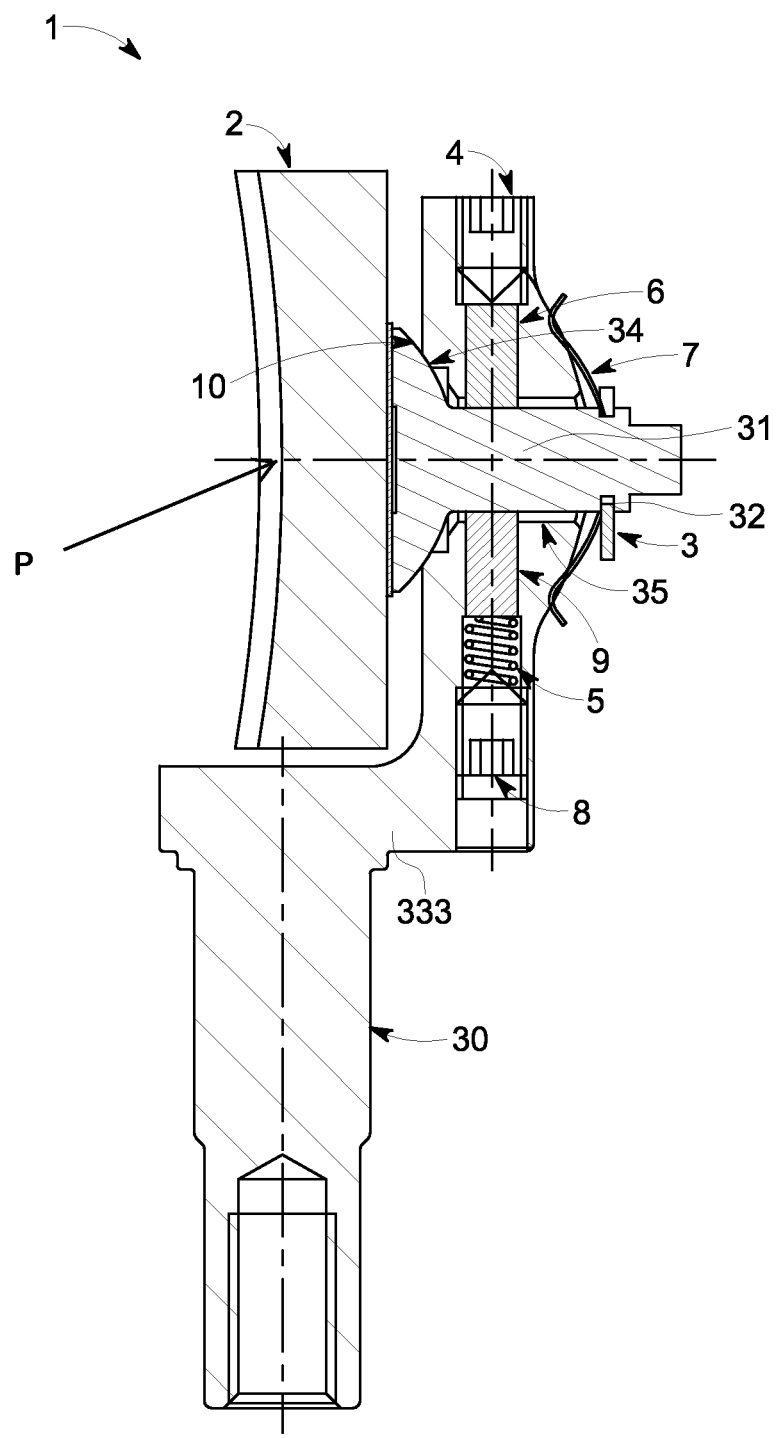
FIG. 3 is a cross-sectional view of the holder according to FIG. 2 along the line A-A and FIG. 4 is a cross-sectional view of the holder according to FIG. 2 along the line B-B.
Figure 4:
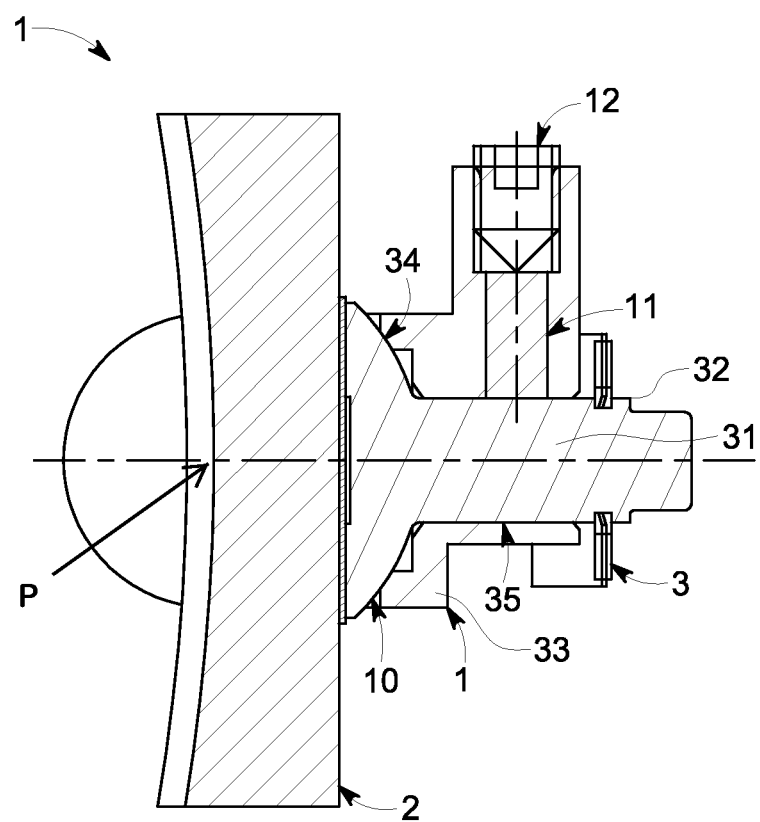

In FIGS. 2, 3 and 4, where FIG. 2 is a perspective view of an embodiment of a grating holder according to the invention, FIG. 3 is a cross-sectional view of the holder according to FIG. 2 along the line A-A and FIG. 4 is a cross-sectional view of the holder according to FIG. 2 along the line B-B, reference 1 denotes a grating holder which can be revolved around a revolution axis when choosing different wave-lengths for the optical unit. In the disclosed embodiment, the revolution axis is defined by a shaft 30, arranged to be rotatably attached to a chassis or the like of the monochromator. In the drawings a grating 2 is solidly attached to a grating hinge 10 having a spherical surface and being tiltable in a seat of the grating holder. The spherical surface of the hinge is kept in contact with the seat by means of a grating hinge spring 7 and a locking washer 3. The grating is solidly attached to the grating hinge 10 by means of e.g. gluing and the spherical surface is shaped so as to have its center point located at the vertex of the holographic grating. Hence the position of the vertex of the holographic grating will be kept essentially static with respect to the revolution axis when the grating hinge is adjusted. The grating hinge spring 7 is resting on a cylindrical surface having its center axis running through the vertex of the holographic grating. As is best viewed in FIGS. 3 and 4, the grating hinge 10 comprises a cylindrical section 31 extending from the spherical surface through the holder main body 33 and which comprises a lock groove 32 receiving the locking washer 3. The holder main body 33 comprises a hinge seat 34 and is formed with a through hole 35 for receiving the cylindrical section 31 of the grating hinge 10. The through hole 35 is essentially coaxial with the hinge seat 34, but as can be seen in FIGS. 3 and 4 in combination, it is of non circular cross section in order to allow displacement of the cylindrical section 31 in the A-A plane but essentially not in the B-B plane. An adjustment screw 4 is working on an adjustment sleeve 6 towards a reverse sleeve 9, a reverse spring 5 and a reverse screw 8. Thus the position of the cylindrical section 31 in the A-A plane may be adjusted by operating the screw 4, whereby the grating can be tilted upwards and downwards. The resulting movement of the grating 2 is a pure rotation about a first adjustment axis transverse to the revolution axis of the holder 1, and to the normal of the vertex of the grating. According to one embodiment, the grating hinge 10 is arranged to enable rotational adjustment of the grating position with respect to the holder 1, the center point of the rotational adjustment being located at the vertex of the grating 2.

The distal end of the cylindrical section 31 is provided with an adjustment head 13 for rotational adjustment of the grating hinge 10 to align the grooved grating lines with the revolution axis of the grating holder 1, so as to achieve a maximum light yield. The upon rotational adjustment by turning the adjustment head 13, the grating hinge 10 is prevented from displacement in the B-B plane my the side walls of the through hole 35, and in the A-A plane by the adjustment sleeve 6 and the reverse sleeve 9. As the rotational adjustment is performed about a second adjustment axis that is orthogonal with respect to the first adjustment axis, any adjustments about either axis can be made independent of the other. When all settings are made the grating hinge 10 is locked in position by means of a locking screw 12 operating on a locking sleeve 11 that acts on the cylindrical section 31 in the B-B plane in order to avoid disturbance of the adjusted position. The locking screw has a conical shape at the tip so as to insert its hit at the center. By doing so any rotation of the grating is prevented when setting the screw.

All the above adjustments and calibration of the correct position are done with the help of a microscope according to a procedure well known by the person skilled in the art. This is thus not part of the invention and will not be described in detail.

The invention as described above by way of an example could obviously be varied in many ways. Such variations are not to be regarded as a departure from the spirit and scope of the invention and all such modification as will be obvious to one skilled in the art are intended to be included in the scope of the following claims.

What is claimed is:

1. An adjustable holder (1) for a concave holographic grating (2) providing the correct positioning of the grating vis-à-vis a light entrance port (15) and a light exit port (20), the holder comprising a grating hinge (10); and a holographic grating (2); the hinge being fixed to said grating (2), wherein said grating hinge (10) provides rotational adjustment of the grating position with respect to said holder (1) about a first adjustment axis and a second different adjustment axis, said rotational adjustment axes extending through the vertex (P) of said grating (2); wherein said grating hinge (10) has a spherical surface moveable in a hinge seat of said holder (1), the center point of the spherical surface being located at the vertex of said grating (2); and wherein the spherical surface is kept in contact with the hinge seat be means of a spring, which acts on a cylindrical surface having its center axis running through the vertex of the holographic grating.

2. The holder of claim 1, wherein said grating hinge (10) is adjustable about the first axis by means of an adjustment screw.

3. The holder of claim 1, wherein said grating hinge at the end remote from the grating is provided with means for rotating said hinge in said seat for adjustment about the second axis.

4. The holder of claim 1, wherein said holder is provided with a locking screw, for locking said hinge.

* * * * *